(No Model.)

C. L. HALSTED.
STEAM COOKING DEVICE.

No. 562,959. Patented June 30, 1896.

WITNESSES:
John Buckler
C. Gerst

INVENTOR
Cornelia L. Halsted,
BY Edgar Tate & Co.
ATTORNEYS.

UNITED STATES PATENT OFFICE.

CORNELIA LIVINGSTON HALSTED, OF TROY, NEW YORK.

STEAM COOKING DEVICE.

SPECIFICATION forming part of Letters Patent No. 562,959, dated June 30, 1896.

Application filed December 31, 1895. Serial No. 573,888. (No model.)

*To all whom it may concern:*

Be it known that I, CORNELIA LIVINGSTON HALSTED, a citizen of the United States, and a resident of Troy, in the county of Rensselaer and State of New York, have invented certain new and useful Improvements in Steam Cooking Devices, of which the following is a specification, reference being had to the accompanying drawings, forming a part thereof, in which similar letters of reference indicate corresponding parts.

This invention relates to steam cooking devices, and the object thereof is to provide an effective device of this class which is adapted to be placed above a kettle or boiler, and which is so constructed and arranged that the steam arising from said kettle or boiler will operate to cook the article or articles placed therein; and with this and other objects in view the invention consists in the construction, combination, and arrangement of parts hereinafter described and claimed.

The invention is fully disclosed in the following specification, of which the accompanying drawings form a part, in which—

Figure 1:
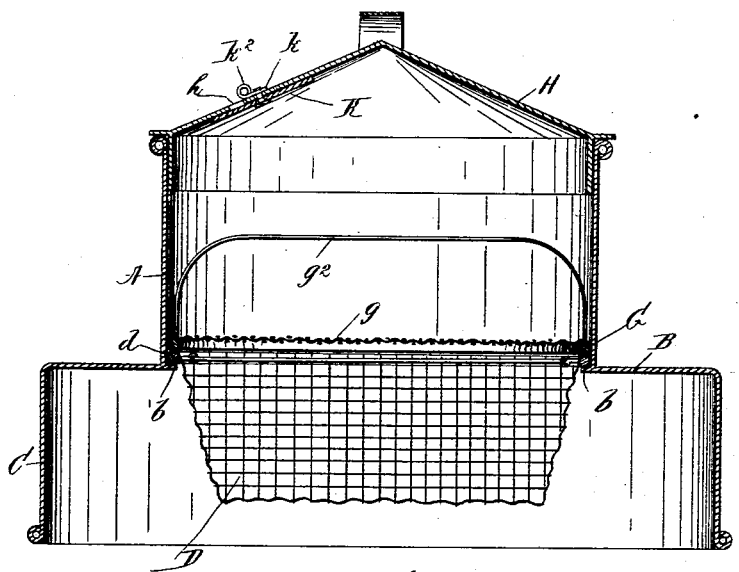
Figure 2:
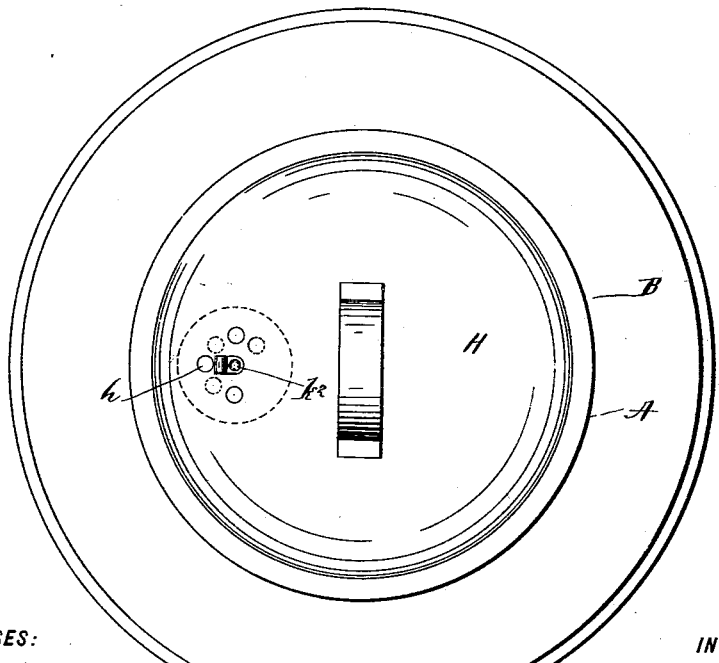

Figure 1 is a central vertical section of my improved steam cooking device, and Fig. 2 a plan view thereof.

In the practice of my invention I provide a cylindrical casing A, which is provided at its lower end with an annular flange B, at the outer edge of which is formed a depending rim C, and the inner edge of the annular flange B extends inwardly, so as to form an annular ledge or shoulder $b$ within the bottom of the cylindrical casing A. I also provide a receptacle D, which is preferably composed of wire mesh or similar material, but which may be composed of perforated sheet metal, and the body portion of which is circular in form in cross-section and the upper edge thereof is provided with a bead or ring $d$, which is adapted to rest on the annular ledge or shoulder $b$, and placed above the annular bead or ring $d$ is a similar ring G, which supports and to which is secured a partition $g$, composed of wire mesh or perforated sheet metal, and secured to the ring G is a bail or handle $g^2$.

The cylindrical casing A is provided with a removable cap or cover H, which is preferably conical in form, and at one side thereof is formed a hole or opening $h$, and pivotally secured to the under side of said cap or cover, adjacent to said hole or opening, is a revoluble plate K, which is provided with a plurality of holes or openings similar to the opening $h$, formed in the cap or cover, and the plate K is connected with the cap or cover by means of a pin $k$, which passes therethrough, and to the outer end of which is secured a knob or handle $k^2$.

This device is intended to provide a vent or escape-valve for the steam, and the operation will be readily understood from the foregoing description when taken in connection with the accompanying drawings.

The device is placed over a kettle or boiler, and by reason of the extended annular flange B said device is adapted to be connected with the kettles or boilers of different sizes, and the articles to be steamed or cooked are placed in the receptacle D, and other articles may be placed in the partition $g$, and the process of cooking or steaming said articles will be readily understood without further description, and the plate K may be operated whenever desired to close or open the vent or port $h$.

It will be apparent that either the partition $g$ or the receptacle D may be employed separately, or that both may be employed at the same time, and my invention is not limited to the form of this receptacle and the partition, or to the material of which they are composed, and I therefore reserve the right to make all such changes in and modifications of the device herein described as fairly come within the scope of the invention.

Having fully described my invention, I claim as new and desire to secure by Letters Patent—

1. A steam cooking device, comprising a cylindrical casing, an annular flange at the bottom thereof, a detachable receptacle suspended within said bottom, and composed of wire mesh or similar material, and a removable cap or cover for the cylindrical casing, said cylindrical casing being also provided with a removable, perforated wire-mesh partition, provided with a bail or handle, and which is placed above the suspended receptacle, substantially as shown and described.

2. A steam cooking device comprising a cylindrical casing, an annular flange at the bottom thereof, a detachable receptacle suspended within said bottom, and composed of wire mesh or similar material, and a removable cap or cover for the cylindrical casing, said cylindrical casing being also provided with a removable, perforated wire-mesh partition, provided with a bail or handle, and which is placed above the suspended receptacle, and said annular flange at the bottom of the cylindrical casing being provided with a depending rim, substantially as shown and described.

In testimony that I claim the foregoing as my invention I have signed my name, in presence of the subscribing witnesses, this 7th day of December, 1895.

CORNELIA LIVINGSTON HALSTED.

Witnesses:
 ANTHONY P. FINDER,
 ELIZA HERMANCE,
 JAMES FARRELL.